Patented Jan. 2, 1951

2,536,845

UNITED STATES PATENT OFFICE 2,536,845

DRYING OIL-DIMER COPOLYMERS AND PROCESS OF MAKING SAME

Anthony H. Gleason, Westfield, N. J., assignor to Standard Oil Development Company, a corporation of Delaware No Drawing. Application January 2, 1947, Serial No. 719,914

7 Claims. (Cl. 260—23.7)

This invention pertains to certain oily or soluble thermoplastic materials and to a method of preparing them.

It has been disclosed in application Serial No. 638,589, filed December 31, 1945, in the names of Miller W. Swaney and Anthony H. Gleason, now U. S. Patent 2,513,244, that cyclic diolefins having a water-like consistency obtained by dimerizing butadiene-1,3 or piperylene can be further polymerized to form oils of high viscosity at ordinary temperatures or soluble, thermoplastic resins of low impact strength by mere heating of these cyclic diolefins or dimers under their own vapor pressure and in the absence of air for from about 10 hours to several days at temperatures of 250–400° C., preferably at temperatures between 290 and 330° C.

It is the object of this invention to prepare oils and resins by the thermal treatment of dimers of butadiene-1,3 and piperylene which possess new and improved properties over those possessed by the products of the above-mentioned application.

It is also the object of this invention to provide a method of preparing novel oils and resins by a thermal treatment of the cyclic dimers of butadiene-1,3 and piperylene.

It is a further object of this invention to prepare new oily or resinous products.

These and other objects will appear more clearly from the following detailed specification and claims.

I have now found that if a drying oil is added to the dimer of butadiene or to the dimer of piperylene and the mixture is then heated in the absence of air to 250–400° C., preferably to between 290 and 350° C. for from ten hours to several days novel, oily to resinous copolymers are formed. The nature of the products formed depends mainly on the time and temperature of the reaction and the ratio of the dimer and drying oil used. Each reactant appears to exert a modifying effect upon the other as shown by the fact that the drying oil heated alone at 300° C. for a comparable period is converted to a solid gel while vinyl cyclohexene (butadiene dimer) heated to 300° C. for the same period is largely converted to a brittle resin. Analysis of the products formed show beyond doubt that a copolymer of drying oil and dimer is formed.

Drying oils which may be used in the production of the products in accordance with the present invention include linseed oil, perilla oil, dehydrated castor oil, tung oil, oiticica oil and the like. Ordinarily from 5 to 25% by weight of the drying oil, based upon the dimer, is sufficient to modify the characteristics of the resins formed. However, useful oils and soft resins may be prepared by copolymerizing up to equal weights of drying oils and dimers. Preferably about 30 to 100 wt. per cent based on dimer gives a modified drying oil. The latter products possess many of the properties of highly bodied drying oils and are useful as substitutes for the pure bodied oils, for example, in paints, varnishes, fabric coatings, linoleums, printing inks, etc. When drying oils are copolymerized with butadiene- and piperylene-dimers in accordance with the present invention, it is preferable to use stainless steel, enamelled or glass-lined vessels to avoid the contamination and discoloration of the resin by metallic soaps.

The following examples are illustrative of the present invention:

*Example 1.*—A mixture of 1-vinyl-3-cyclohexene and raw tung oil containing 10 wt. percent of the latter was heated in a stainless steel pressure vessel at 310° C. for 70 hours. The product was extracted with a mixture of benzol and acetone and gave a 75% yield of resin.

*Example 2.*—Vinyl cyclohexene of 94% purity (504 g.) and 45 g. of dehydrated castor oil were heated for 38 hours at 310° C. in a stainless steel reactor under pressure. The crude product was of a semi-resinous nature. A varnish composed of 1.1 pounds refined tung oil and 1.0 pound of crude resin (15 gal. length) was prepared having a cure-point of 70 sec. at which point the pills were noticeably cloudy. Cast films were light in color and perfectly clear. The tabulation given below is a rating of the properties of the air dried and baked films, zero being excellent and 9 representing failure. It will be seen that with the exception of only fair grease resistance of the air dried film the results were uniformly good:

|  | Air Dried (48 Hrs.) | Baked [1] (1 Hr. @ 125° C.) |
|---|---|---|
| Water Resistance | 2 | 0 |
| Soap Resistance | 0 | 0 |
| Grease Resistance | 5 | 0 |
| Caustic Resistance | 0 | 1 |
| Hardness | 0 | 0 |
| Flexibility | 0 | 0 |

[1] Lead and manganese driers used in air dried films; none in baked films.

*Example 3.*—Equal volumes of alkali-refined linseed oil and vinyl cyclohexene when heated in a stainless steel bomb at 310° C. bodied at a rate considerably slower than that of the oil alone. After 4 hours the viscosity was L (Gardner) or 3 poises, in 6 hours the viscosity was U (Gardner) or 6.3 poises, and in 10 hours it had reached a Z4 or 63 poises. A baked film of the bodied oil (1 hr. @ 125° C.) had the following ratings:

| | |
|---|---|
| Water resistance | 1 |
| Soap resistance | 5 |
| Grease resistance | 5 |
| Alkali resistance | 9 |
| Hardness | 0 |
| Flexibility | 0 |

This test is of little significance for most varnishes.

A similar mixture containing 40% of linseed oil was heated under the same conditions and found to give films of generally lowered resistances: water, grease, soap and alkali were 2, 6, 9, 9 respectively for both baked and air dried films.

*Example 4.*—Equal volumes of oiticica oil and vinyl cyclohexene were heated for 6 hours at 310° C. to give a one-stage varnish having a Z4 viscosity (63 poises). Air dried and baked films evaluated as follows:

| | Air Dried (48 Hrs.) | Baked |
|---|---|---|
| Water resistance | 1 | 1 |
| Grease resistance | 2 | 3 |
| Soap resistance | 9 | 3 |
| Caustic resistance | 9 | 9 |
| Hardness | 4 | 0 |
| Flexibility | 9 | 4 |

*Example 5.*—Vinyl cyclohexene (375 g.) and raw oiticica oil (45 g.) were heated in a glass-lined pressure reactor for 64 hours at 310° C. The crude resin was dissolved in benzol and reprecipitated with acetone (twice) to give an excellent yield of high melting resin (solvent was stripped by blowing with nitrogen up to 200° C.).

Analysis of the extracted resin (carbon 87.79, hydrogen 11.07 and oxygen 1.14%) showed it to contain about 7% of combined oiticica oil—based on oxygen content, since uncombined oil would have been soluble in the acetone. This is slightly less than the percentage of oil in the original mixture.

*Example 6.*—Vinyl cyclohexene containing 11% of tung oil was heated in a glass-lined reactor for 40 hours at 315° C. The crude resin was twice precipitated from benzol with acetone and stripped of solvent by blowing with carbon dioxide at 200° C. Yield of resin was 60% (100° C. softening point). The saponification number (16.28 g. KOH/g.) and oxygen content (1.21%) of the extracted resin corresponded to 10% combined tung oil. A 15 gal. varnish of resin and tung oil bodied at 400–450° F. was prepared and yielded air dried films of excellent water, grease, and soap resistances but poor flexibility.

*Example 7.*—A one stage varnish prepared by heating equal volumes of tung oil and vinyl cyclohexene at 300° C. for 6 hours was found to have a color of 6 and a V (Gardner) viscosity; in 12 hours a viscosity of Z6 (148 poises) was obtained. The mixture did not gel even on heating for 24 hours and gave the following evaluation for air dried and baked films:

| | Air Dried [1] (48 Hrs.) | Baked [2] (1 Hr. @ 125° C.) |
|---|---|---|
| Water resistance | 4 | 0 |
| Grease resistance | 3 | 0 |
| Soap resistance | 1 | 0 |
| Caustic resistance | 4 | 0 |
| Hardness | 7 | 0 |
| Tack | 3 | 0 |
| Flexibility | 6 | 6 |

[1] Lead and manganese driers added.
[2] No drier.

The foregoing description contains a limited number of embodiments of the present invention. It will be understood, however, that this invention is not limited to the specific conditions described since numerous variations are possible without departing from the scope of the following claims.

What I claim and desire to secure by Letters Patent is:

1. The process of preparing polymerization products which consists of heating to a temperature of 250 to 400° C. from 5 weight percent to an equal amount by weight of a fatty drying oil with a member of the group consisting of the cyclic dimer of butadiene-1,3 and the cyclic dimer of piperylene until a resin is formed.

2. The process of preparing polymerization products which consists of heating to a temperature of 250 to 400° C. from 5 weight percent up to an equal amount by weight of linseed oil with a member of the group consisting of the cyclic dimer of butadiene-1,3 and the cyclic dimer of piperylene until a resin is formed.

3. The process of preparing polymerization products which consists of heating to a temperature of 250 to 400° C. from 5 weight percent up to an equal amount by weight of tung oil with a member of the group consisting of the cyclic dimer of butadiene-1,3 and the cyclic dimer of piperylene until a resin is formed.

4. The process which consists of heating to a temperature of 250 to 400° C. from 5 to 100% by weight of a fatty drying oil with 1-vinyl-3-cyclohexene until a resin is formed.

5. The process which consists of heating to a temperature of 250 to 400° C. from 5 to 100% by weight of linseed oil with 1-vinyl-3-cyclohexene until a resin is formed.

6. The process which consists of heating to a temperature of 250 to 400° C. from 5 to 100% by weight of tung oil with 1-vinyl-3-cyclohexene until a resin is formed.

7. A copolymer of a drying oil and a cyclic dimer of butadiene prepared by the process of claim 1.

ANTHONY H. GLEASON.

REFERENCES CITED

The following references are of record in the file of this patent:

UNITED STATES PATENTS

| Number | Name | Date |
|---|---|---|
| 2,205,108 | Rosen | June 18, 1940 |
| 2,313,728 | Austin et al. | Mar. 16, 1943 |
| 2,370,688 | Rummelsburg | Mar. 6, 1945 |

FOREIGN PATENTS

| Number | Country | Date |
|---|---|---|
| 516,931 | Great Britain | Jan. 16, 1940 |
| 747,583 | France | Apr. 4, 1933 |